UNITED STATES PATENT OFFICE 2,495,567

PREPARATION OF ACID DERIVATIVES FROM UNSATURATED COMPOUNDS

Marvin Carmack, Swarthmore, Pa., and De Los F. De Tar, Buffalo, N. Y., assignors to Rohm & Haas Company, Philadelphia, Pa., a corporation of Delaware No Drawing. Application August 18, 1945,
Serial No. 611,452

11 Claims. (Cl. 260—247)

This invention relates to a method for preparing amides of carboxylic acids and their derivatives from unsaturated compounds.

It has been shown that compounds having a carbonyl group in an acyclic chain react with ammonium polysulfides or amines and sulfur to form amides. It is now found that compounds having an acyclic chain containing an olefinic or acetylenic linkage are converted to amides when treated with sulfur and ammonia or an amine having a reactive hydrogen on the amino-nitrogen.

The term "amide," referring to the basic nitrogen derivatives of carboxylic acids, is here used in its broadest sense and includes not only acid amides in which a hydrogen of ammonia is replaced by an acid radical, but also amides in which one hydrogen has been replaced by an acid radical and one or both of the remaining hydrogens have been replaced by a substituent, such as alkyl, aryl, aralkyl, cycloalkyl, or the like. The term as used generically also includes thioamides, in which the oxygen of the carbonyl group in the ordinary carboxylic amide is replaced with sulfur. These various sorts of amides are all possible products from the newly discovered reaction described herein.

In the broadest concept, this invention concerns the conversion of acyclic, unsaturated groups to acidic groups, particularly amide groups. The unsaturated compound may contain other functional groups than an olefinic or acetylenic linkage so long as they are not such as to undergo ready condensation or as to cause disruption of the compound under conditions of amide formation. Groups, such as nitro or amino, are reactive under the conditions required to bring about the introduction of the amide function. A carbonylic group may also be converted to an amide group, in accordance with known reactions, and a carboxylic acid group or even an ester group may be converted to an amide group. Nevertheless, the unsaturated group even in the presence of such other groups is capable of yielding the desired amide group.

The great variety of unsaturated compounds which are amenable to the reaction herein disclosed may be illustrated with typical compounds composed of carbon and hydrogen. There may be used purely aliphatic olefinic hydrocarbons such as ethylene, propylene, butylene, amylene, hexene, heptene, octene, dodecene, octadecene, and the like. The position of the double bond may vary as in heptene-2, octene-4, or heptene-3, yet with such hydrocarbons as the above the amide group which results in the course of the reaction is found on a terminal carbon atom substantially without rearrangement of the chain or loss of carbon atoms therefrom. Branched chained hydrocarbons react similarly, except sometimes cleavage of a complicated molecule may occur, but still with formation of an amide group. In place of olefinic hydrocarbons, there may be used acetylenic analogues, such as allylene, crotonylene, ethylacetylene, pentyne-2, isopropylacetylene, hexyne-2, octyne-4. The unsaturated material may contain more than one olefinic or acetylenic linkage, as in diallyl or dipropargyl. The hydrocarbon need not be purely aliphatic; it may be a mixed compound, that is, it may contain an acyclic portion and a cyclic portion, as in styrene, α-methyl styrene, divinyl benzene, phenylacetylene, phenylpropene-1 or -2, phenylpropyne-1 or -2, cyclohexylacetylene, 1-cyclohexylpropyne, 1-cyclohexylbutyne, limonene, butenylendomethylenecyclohexene, vinyl cyclohexene, vinyl thiophene, or vinyl pyridine.

While unsaturated hydrocarbons form one class of reactants of particular interest, the amide-forming reaction is not confined to such hydrocarbons. There may also be used as starting materials compounds containing functional groups such as ether, ester, ketone, aldehyde, amide, carboxylic acid, alcohol, and the like, even though such group or groups may undergo reaction with the reagents used to act upon the unsaturated linkage. Typical of such compounds are phenyl allyl ether, allyl acetate, undecylenamide, undecylenic acid, oleyl alcohol, oleic acid, crotonaldehyde, allyl alcohol, propargyl alcohol, propargylcarbinol, 4-hydroxypentene-2, 5-hydroxypentene-1, allyldimethylamine, and the like.

In place of acyclically unsaturated compounds, there may be used compounds which, though initially saturated, readily form unsaturated compounds under conditions of the reaction, such as halogenated compounds, which are readily dehydrohalogenated in the presence of a strongly basic amine. Furthermore, the methods of this invention may be applied to polymeric products which contain chains having an unsaturated linkage available for reaction, thus modifying the polymeric material.

The nitrogen for amide formation is supplied by a basic trivalent nitrogen compound having reactive hydrogen on the nitrogen. Suitable nitrogen compounds include ammonia, methylamine, butylamine, monoisobutylamine, various amylamines, octylamines, and the like, cyclohexylamine, benzylamine, β-phenylethylamine, ethanolamine, dimethylamine, diethylamine, diisopropylamine, dibutylamine, diisobutylamine, di-2-ethylhexylamine, diethanolamine, morpholine, piperidine, pyrrolidine, naphthylamine or, in general, strongly basic primary and secondary amines and ammonia, $NH_2R$, $NHR_2$, and $NH_3$, where R is alkyl, aralkyl, cycloakyl, aryl, heterocyclic, or heterocyclic-aliphatic, or a similar group having relatively inert substituents. Since aromatic amines are prone to form colored bodies and tarry materials which may interfere with the separation of the desired end products in a pure form, the non-aromatic primary and secondary amines are preferred. The term "non-aromatic" is used here, as commonly, to exclude amines in which basic nitrogen is attached directly to an aromatic nucleus and to define amines in which the nitrogen is attached to a non-aromatic carbon atom and may be considered to be aliphatically bound, that is to say, is attached to an aliphatic or cycloaliphatic chain or group. When non-aqueous systems are employed, it is preferred that the non-aromatic amines be free from highly reactive methylene groups, such as occur in juxtaposition to a strongly negative group. It will be noted that in the case of some secondary amines the N-substituent groups, $R_2$, form a divalent aliphatic chain which in conjunction with the amino nitrogen yields a heterocycle. Strongly basic amines are to be preferred, particularly those amines which are not readily dehydrogenated, as amines which may be dehydrogenated under the conditions of the main reaction here disclosed tend to give poor yields. Although monoamines are to be preferred for economy and simplicity of operation, the reaction of this invention also occurs with polyamines, and carboxyl derivatives result therefrom.

While anhydrous systems may be used, it is also practical to use aqueous systems, particularly in the case of ammonia, which is most conveniently used in concentrated aqueous solution. Water-soluble amines, such as the methylamines, may be likewise used in water. When ammonia water is used, the amides obtained are normal carboxylic amides and at the same time some amide is often hydrolyzed to carboxylate, the product obtained being a mixture of amide and a minor amount of an ammonium salt. Organic solvents are also useful. These include an excess of the reactive amine used as a reagent, such as morpholine or other normally liquid amine. Some liquid tertiary amines, such as pyridine, are likewise very effective solvents. Dioxane represents another type of solvent, having a good solubility for both reactive nitrogen compounds and unsaturated compounds. Solvents having a normal boiling range between 100° C. and 200° to 250° C. are useful in permitting the reaction to be carried on under reflux at normal pressures provided the basic nitrogen compound is not too low-boiling. Other solvents which may be used include benzene, ethylene glycol, methoxymethoxyethanol, ethoxyethoxyethanol, and other glycol and glycol ethers, as well as glycol esters and ether esters, ether amines, etc. Mixtures of solvents are frequently highly desirable.

Sulfur may be used in the reaction mixture in the form of flowers of sulfur or in other finely divided form. It may also be dissolved in the basic nitrogen reagent as a polysulfide. Thus, ammonium polysulfide may be prepared by passing hydrogen sulfide into a suspension of sulfur in ammonia water. Alternatively, ammonium sulfide may be formed and sulfur added to it, although, according to our observation, in some cases lower yields of amides may result when ammonia is saturated with hydrogen sulfide, since this is prone to promote reductive side reactions. As a matter of fact, hydrogen sulfide as such need not be used, as it apparently forms during the reaction and promotes solution of sulfur in the reaction mixture.

The minimum proportion of ammonia or amine to unsaturated group is theoretically one to one, while in the case of acetylenic groups one atom of sulfur and in the case of ethylenic groups two atoms of sulfur per mol of unsaturated compound appear to meet the minimum requirements. Practically, however, there may be used an excess of any of the reactants, particularly sulfur or basic nitrogen compound or both.

The reaction between unsaturated compound, basic nitrogen compound, and sulfur occurs when these reactants are brought together and heated. When anhydrous ammonia, ammonia hydroxide, or low-boiling amines are used, it is generally necessary to work in a closed system under pressure. Temperatures of about 100° C. to 250° C. provide a suitable range in which reactions may be performed, with temperatures of 130° to 230° C. being most commonly employed. The use of organic solvents, such as dioxane or glycol ethers, usually permits the reaction to occur at lower temperatures than would be possible without such solvents, particularly with aqueous ammonium polysulfide. Side reactions are then minimized with the production of purer amides and with less hydrolysis to ammonium salt.

The time of reaction is, of course, dependent upon a number of conditions, in particular temperature. Relatively less reactive unsaturated compounds may require twelve to twenty-four hours for reaction, but usually shorter times are sufficient and desirable as they avoid side reactions. Times of two to six hours at the preferred temperatures are usually adequate for good conversion.

It often happens that the desired amide is insoluble in the cooled reaction mixture and may be isolated by simple filtration. In other cases, some of the amide may precipitate and the rest be retained in the mother liquor, which may be worked up by conventional methods, including extraction. Water or organic solvent may be volatilized to leave a residue of amide, excess sulfur, ammonium or amine salt, and by-products. The amide may then be taken up in a solvent, such as water, alcohol, acetic acid, or carbon tetrachloride, and further purified as desired. When anhydrous amines are used as reactants, the reaction mixture may be taken up in a solvent immiscible with water, such as ether, washed with dilute solutions of acid and/or alkali and with water, dried, and concentrated. In many cases, the amides can be crystallized and in some distilled at low pressures. Many of the amides obtainable by the process of this invention are new.

It is sometimes not required to separate the amide as such, since the carboxylic acid may be the desired product. In such case, the product formed or the crude amide may be directly hydrolyzed by heating with aqueous or alcoholic alkali or with aqueous mineral acid. A mixture of acetic acid and hydrochloric acid is particularly effective for such purposes, even in the case of very insoluble amides. The carboxylic acid may be worked up by conventional methods.

When the reaction of unsaturated compound, basic nitrogen compound, and sulfur is performed in an aqueous system, the chief product is usually a carboxylic amide. Apparently thioamides, if formed, are converted by aqueous ammonia as follows:

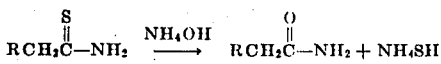

The invention is illustrated by the following examples.

Example 1

A mixture of 21.7 grams of styrene (99.5% purity, containing a small amount of hydroquinone as polymerization inhibitor), 45 grams (50 cc.) of concentrated aqueous ammonia (15 M.), 37.5 grams of flowers of sulfur, and 30 cc. of pyridine was sealed in a hard glass tube and heated at 165° C. for four hours (bomb tube furnace). The tube was cooled, opened, and the contents evaporated to dryness on a water bath. The dry residue was extracted with several portions of hot water, totalling 1000 cc. From the clarified extracts two crops of crystalline phenylacetamide were isolated by chilling, filtering, and subsequent concentration of the filtrates. The total yield of amide was 16.1 grams (57%), having a melting point of 158.6°–160.1° C. (cor.). From the residual filtrate two grams of a mixture of phenylacetic acid and phenylacetamide was isolated, bringing the total yield of amide and acid to 64%.

Example 2

A mixture of 8.5 parts of phenylacetylene, 26.6 parts of flowers of sulfur, 45 parts of aqueous ammonia (15 M.), and 25 parts of pyridine was heated in a sealed glass tube at approximately 155° C. for five hours. The reaction mixture was evaporated to dryness and the residue extracted with hot water. From the extracts was isolated 9.0 parts (80%) of phenylacetamide.

Example 3

A mixture of 9.25 parts of phenylacetylene, 52 parts of dioxane, and 37 parts of ammonium sulfide-sulfur solution was sealed in a hard glass tube and heated for six hours at 150° C. The ammonium sulfide-sulfur solution was prepared by suspending flowers of sulfur in concentrated aqueous ammonia (15 M.), in the ratio of 1 part by weight to 8.9, and passing hydrogen sulfide gas into the mixture just long enough to cause all of the sulfur to dissolve to form a clear red solution. After the mixture of reacting components had been heated, it was evaporated to dryness and the reaction products removed by extraction with hot water. The yield of phenylacetamide was 7.0 parts (57%).

Example 4

A mixture of 27.2 parts of styrene (99.5% purity, containing hydroquinone inhibitor), 138 parts of ammonium sulfide-sulfur solution (containing the equivalent of 12.0 M. ammonium hydroxide, 0.60 M. hydrogen sulfide, and 19.2 parts of sulfur), and 155 parts of dioxane was heated for seven hours at 160° C. From the residue obtained after evaporation of the reaction mixture to dryness 19.1 parts (54%) of phenylacetamide was isolated by extraction with hot water.

Example 5

A mixture of 2.1 parts of styrene, 1.3 parts of flowers of sulfur, and 10 parts of morpholine was heated in an oil bath at 140° C. for six and one-half hours (under reflux condenser). The reaction mixture was taken up in water and ether, the solid product filtered, and further portions of thiomorpholide were recovered from the ether. The total yield of solid was 2.3 parts (52%), with a melting point of 76°–78° C. Recrystallization was effected from ethanol, giving colorless needles melting at 78.5°–79.5° C.

Example 6

A mixture of 6.3 parts of sulfur and 72 parts of morpholine was placed in a flask equipped with a dropping funnel, stirrer, and condenser. The mixture was heated to 100° C. in an oil bath, and the temperature was maintained at about 100° C. while 21 parts of phenylacetylene was run in with stirring during a period of fifteen minutes. After addition of the phenylacetylene, the mixture was heated at 100° C. for one hour and, after the mixture was cooled, the product was isolated as described in the example above. The yield of amide was 26.8 parts (57.6%—phenylacetothiomorpholide).

Example 7

A mixture of 9.8 parts of 1-phenylpropene-1, 27 parts of sulfur, 47 parts of ammonium sulfide solution (containing the equivalent of 2.3 M. hydrogen sulfide and 12.6 M. ammonia), and 25 parts of pyridine was heated in a sealed glass tube at 153° C. for three and one-half hours. The product, β-phenylpropionamide, was isolated as described above for the example of phenylacetamide from styrene in aqueous ammonia solution. The yield of colorless crystalline material, having a melting point of 99°–100° C. (cor.), was 8.3 parts (67%).

Example 8

A mixture of 9.8 parts of 1-phenylpropene-1, 27 parts of sulfur, 45 parts of concentrated (15 M.) aqueous ammonia, and 25 parts of pyridine was heated in a sealed glass tube at 153° C. for three and one-half hours. The product was isolated exactly as for the preceding example, and amounted to 9.2 parts of the amide (74%). It is to be noted that the absence of hydrogen sulfide in the original reaction mixture gave better results with this starting material than the mixture containing hydrogen sulfide initially as described in the preceding example.

Example 9

A mixture of 9.7 parts of 1-methyl-2-phenylacetylene, 47 parts of ammonium sulfide solution (containing the equivalent of 2.3 M. hydrogen sulfide and 12.6 M. ammonium hydroxide), 27 parts of sulfur, and 25 parts of pyridine was heated at 156° C. for four hours. The crystalline β-phenylpropionamide was recovered as described in the examples above. The yield was 11.5 parts (93%).

Example 10

A mixture of 33.6 parts of 1-heptyne, 88 parts of ammonium sulfide solution (containing the equivalent of 12 M. ammonium hydroxide and 7 M. hydrogen sulfide), 112 parts of sulfur, and 80 parts of pyridine was heated in a sealed glass tube at 140° C. for four hours. The cooled reaction mixture was evaporated to dryness and the residue extracted with hot water. From the hot aqueous extracts 12.3 parts (27.3%) of n-heptamide, having a melting point of 97° C. (cor.), separated on cooling and a further crop of 2.4 parts recovered from the filtrate brought the yield to 33% of theory.

Example 11

A mixture of 1.96 parts of 1-heptene, 6.4 parts of sulfur, 7.1 parts of concentrated aqueous ammonia (15 M.), and 5 parts of pyridine was heated in a sealed glass tube at 160° C. for four hours. The cooled reaction mixture was worked up as described above for the reaction with 1-heptyne. A total of 0.10 part (4%) of n-heptamide was isolated from the reaction mixture. A considerable amount of unidentified material was present. When the starting mixture was previously saturated with hydrogen sulfide, no n-heptamide was isolated, in contrast to the behavior of 1-heptyne, which gave a 33% yield of n-heptamide in a mixture containing the equivalent of 7 M. hydrogen sulfide.

Example 12

A mixture of 23.2 parts of α-methylstyrene, 89 parts of concentrated aqueous ammonia (15 M.), 64 parts of sulfur, and 50 parts of pyridine was heated in a sealed glass tube at 190° C. for four hours. The reaction mixture was worked up as described for the reaction of styrene in aqueous ammonia, and from the residue a total of 15.3 parts of crystalline amide was isolated in two crops. The first crop (6.5 parts) melted at 99°–99.5° C., and the second crop (8.8 parts) melted at 92°–94° C. The crystals were primarily α-phenylpropionamide. A small amount of phenyl acetamide was also formed.

Example 13

A mixture of two mols of 2-naphthylethylene, six mols of sulfur, and three mols of morpholine, when heated under reflux for fifteen hours and poured into hot alcohol, yields crystals of 2-naphthylacetothiomorpholide having a melting point of 102°–108° C.

When a mixture of 100 parts of this thiomorpholide, 250 parts of acetic acid, 100 parts of concentrated hydrochloric acid, and a small amount of water is heated under reflux conditions for five hours, the amide is hydrolyzed to the corresponding carboxylic acid. This product recrystallized from benzene melts at 142°–143° C.

In place of the above unsaturated compound, there may be used a similar proportion of dichlorophenyl allyl ether, which upon reaction with sulfur and morpholine yields the β-(2,4-dichlorophenoxy)-propiothiomorpholide.

Example 14

A mixture of 2.10 grams of freshly distilled 2-vinylpyridine, 6.4 grams of sulfur, 6 cc. of concentrated aqueous ammonia, and 3 cc. of pyridine was heated in a glass bomb tube at 150° C. for four hours. The reaction mixture was evaporated to dryness on a water bath and the dry residue extracted with hot water. The aqueous solution yielded 1.67 grams of crude dark solid. One and four-hundredths grams of the solid was sublimed under reduced pressure, yielding 0.72 gram of light-brown solid having a melting point of 100°–113° C. Two recrystallizations from chloroform-ligroin mixture yielded pale yellow needles of 2-pyridyl acetamide having a melting point of 121°–122° C. (cor.).

The reaction of a basic trivalent nitrogen compound being free of activated methylene groups and having reactive hydrogen, sulfur, and a compound having an acyclic, unsaturated group appears to follow a course as follows:

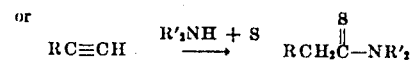
or
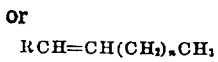
or
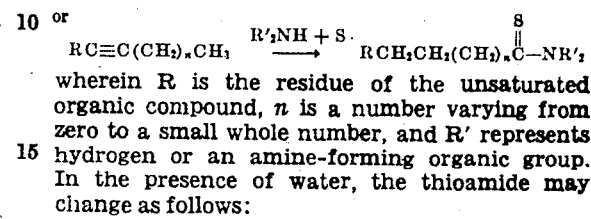

wherein R is the residue of the unsaturated organic compound, n is a number varying from zero to a small whole number, and R' represents hydrogen or an amine-forming organic group. In the presence of water, the thioamide may change as follows:

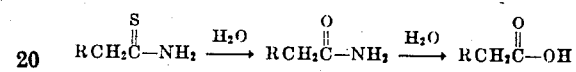

As typical of reactions with ammonium hydroxide and sulfur or with ammonium polysulfide, the reaction may be represented

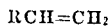
or
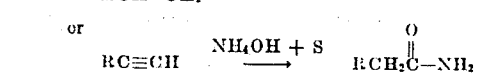
or
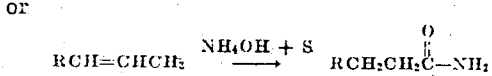

Typical of reactions with a primary amine in an anhydrous system is the following:

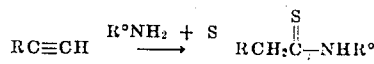

where R° is, for example, an alkyl group, such as methyl. A secondary amine gives an N,N-disubstituted amide, thus, using morpholine as a typical amine,

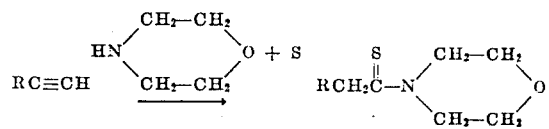

A branched chain compound in an aqueous ammonium polysulfide solution reacts as follows:

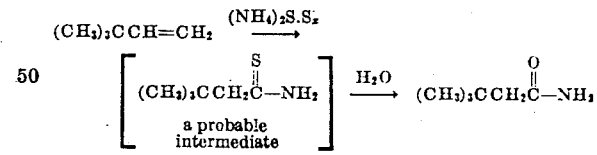

This invention provides a novel method for converting an acyclic unsaturated group into an acid derivative, in particular an amide, by reaction with an amino body and sulfur. The reaction is accomplished directly without resort to complicated intermediate steps. The method makes possible the production of acid derivatives from unsaturated hydrocarbons and the introduction of amide or acid groups into a great variety of unsaturated compounds having a stable functional group in addition to the unsaturated linkage. The reaction is generally applicable not only to purely aliphatic unsaturated compounds but also to mixed cyclic and acyclic compounds in which the acyclic portion is unsaturated. The reagents required are not expensive and the yields are usually good. The new process makes possible another way to form carboxylic acids and their derivatives, which find applications in the preparation of soaps, wetting agents, flotation agents, resins, plasticizers, and the like. The dicarboxylic acids and the hydroxy carboxylic acids which may be formed are of particular value in making linear polyesters. When amides are reduced, amines are obtained. Reaction of diamines and dicarboxylic acids is of interest in the formation of linear polyamides. The amides also find use in the pharmaceutical field and as intermediates in the preparation of other pharmaceutically valuable compounds. Dehydration of the amides yields nitriles which are readily converted to amidines, amines, heterocycles, etc. Esters may be formed from the amides or carboxylic acids by known methods. These examples serve but to emphasize the utility of the reaction of acyclically unsaturated compounds, trivalent nitrogen compounds, and sulfur.

We claim:

1. A process for preparing phenylacetamide which comprises reacting by heating at 130° to 230° C. styrene, sulfur, and ammonia, the sulfur and ammonia being supplied from ammonium polysulfide in aqueous solution and being present in amounts more than chemically equivalent to the styrene, and separating from the resulting reaction mixture phenylacetamide.

2. A process for preparing carboxylic acid amides which comprises heating to an elevated temperature in excess of 100° C. an olefin of the group consisting of alkenes and arylalkenes with aqueous ammonium polysulfide.

3. A process according to claim 2 wherein the olefin is styrene.

4. A process for preparing an amide of a carboxylic acid which comprises reacting by heating in excess of 100° C. a mixture of a hydrocarbon which possesses an acyclically unsaturated chain, sulfur, and a basic trivalent nitrogen compound in which the nitrogen carries at least one hydrogen atom and any other N-substituent is a member of the class consisting of alkyl groups of not over eight carbon atoms, the divalent

—CH₂CH₂OCH₂CH₂— group, and divalent polymethylene chains of four to five carbon atoms, the amount of sulfur and nitrogen compound in the reacting mixture being more than chemically equivalent to the said hydrocarbon.

5. A process for preparing an amide of a carboxylic acid which comprises reacting by heating between 100° C. and 230° C. a mixture of an acyclically unsaturated hydrocarbon, sulfur, and a basic monoamino compound in which the trivalent nitrogen has at least one valence satisfied with hydrogen and any valence thereof not taken up by hydrogen is satisfied by a member of the class consisting of alkyl groups of not over eight carbon atoms, the divalent —CH₂CH₂OCH₂CH₂— group, and divalent polymethylene chains of four to five carbon atoms, the amount of sulfur and said monoamino compound in the reacting mixture being more than chemically equivalent to the said hydrocarbon.

6. A process for preparing a thioamide of a monocarboxylic acid which comprises mixing together an acyclically unsaturated hydrocarbon, sulfur, and morpholine, the amount of sulfur and morpholine in the mixture being more than equivalent to the hydrocarbon, heating the mixture between 100° C. and 230° C., and separating a thioamide.

7. A process for preparing a thioamide of a monocarboxylic acid which comprises mixing an arylaliphatic hydrocarbon in which the aliphatic group is unsaturated, sulfur, and morpholine, the amount of sulfur and morpholine in the resulting mixture being more than equivalent to the hydrocarbon, heating the mixture between 130° C. and 230° C., and separating from the reaction mixture of thioamide.

8. A process for preparing phenylacetothiomorpholide which comprises mixing together styrene, sulfur, and morpholine, the amount of sulfur and morpholine in the mixture being in chemical excess of the styrene, heating the mixture at a temperature between 130° C. and 230° C., and separating the thiomorpholide from the reaction mixture.

9. A process for preparing phenylacetamide which comprises mixing an arylaliphatic hydrocarbon in which the aryl group is the phenyl radical and the aliphatic group contains only two carbon atoms joined together by an unsaturated linkage, sulfur, and aqueous ammonia, the amount of sulfur and ammonia being present in an amount more than chemically equivalent to the hydrocarbon, reacting the resulting mixture by heating it to a temperature between 130° C. and 230° C., and separating phenylacetamide from the reaction mixture.

10. The process of claim 9 in which the reacting is done in the presence of an organic solvent.

11. A process for preparing phenylacetamide which comprises reacting together at 130° C. to 230° C. an arylaliphatic hydrocarbon in which the aryl group is the phenyl radical and the aliphatic group contains only two carbon atoms joined together by an unsaturated linkage, sulfur, and ammonia, the sulfur and ammonia being supplied by an aqueous ammonium polysulfide solution present in an amount more than chemically equivalent to the hydrocarbon, and separating from the resulting reaction mixture phenylacetamide.

MARVIN CARMACK.
DE LOS F. DE TAR.

REFERENCES CITED

The following references are of record in the file of this patent:

UNITED STATES PATENTS

| Number | Name | Date |
|---|---|---|
| 1,854,480 | Mnookin | Apr. 19, 1932 |
| 2,061,019 | Carter | Nov. 17, 1936 |
| 2,342,582 | Hooker | Feb. 22, 1944 |